United States Patent
Wu (10) Patent No.: US 9,783,074 B2
(45) Date of Patent: Oct. 10, 2017

(54) PARKING BARRIER AND BATTERY CHARGING APPARATUS USING SAME

(71) Applicant: HON HAI PRECISION INDUSTRY CO., LTD., New Taipei (TW)

(72) Inventor: E-In Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 262 days.

(21) Appl. No.: 14/816,242

(22) Filed: Aug. 3, 2015

(65) Prior Publication Data
US 2017/0036551 A1     Feb. 9, 2017

(51) Int. Cl.
B60L 11/18     (2006.01)
E01F 13/08     (2006.01)

(52) U.S. Cl.
CPC ........... B60L 11/182 (2013.01); E01F 13/085 (2013.01)

(58) Field of Classification Search
CPC ....... E01F 13/04; E01F 13/042; E01F 13/044; E01F 13/06; E01F 13/065; E01F 13/08; E01F 13/085
USPC ........................................... 404/6; 49/31, 49
See application file for complete search history.

(56) References Cited

U.S. PATENT DOCUMENTS

| | | | | |
|---|---|---|---|---|
| 263,458 A * | 8/1882 | Armstrong | ............. | E01F 13/08 49/134 |
| 3,503,480 A * | 3/1970 | Selby, Jr. | ............. | E01F 13/065 194/215 |
| 3,748,782 A * | 7/1973 | Reynolds | ............. | E01F 13/105 49/131 |
| 3,849,936 A * | 11/1974 | Geraci | ............. | E01F 13/085 49/35 |
| 4,822,206 A * | 4/1989 | Roussel | ............. | E01F 9/629 404/10 |
| 4,974,991 A * | 12/1990 | Mandavi | ............. | E01F 9/529 404/11 |
| 5,639,178 A * | 6/1997 | Wilson | ............. | E01F 13/085 404/6 |
| 6,398,452 B1 * | 6/2002 | Wagner | ............. | E01F 13/08 404/6 |
| 7,001,099 B2 * | 2/2006 | Rittenhouse | ............. | E01F 13/08 404/6 |
| 7,320,557 B1 * | 1/2008 | Potter | ............. | E01F 13/123 404/6 |
| 7,530,759 B2 * | 5/2009 | Gelfand | ............. | E01F 13/085 404/10 |

(Continued)

Primary Examiner — Gary Hartmann
(74) Attorney, Agent, or Firm — Steven Reiss (57) ABSTRACT

The battery charging apparatus includes a charging pile, a driving member electrically coupled to the charging pile and powered by the charging pile, and a parking barrier positioned adjacent to the charging pile. The parking barrier includes a fixing base, a barrier mechanism, an elastic member, a connecting member. The barrier mechanism is rotatably coupled with the fixing base. The elastic member is positioned between the fixing base and the barrier mechanism. One end of the connecting member is coupled with the barrier mechanism, and another end of the connecting member is configured for coupling with the driving member powered. The barrier mechanism is driven to fall down when the driving member pulls the connecting member. The disclosure also supplies a parking barrier for the battery charging apparatus.

20 Claims, 8 Drawing Sheets

(56) References Cited

U.S. PATENT DOCUMENTS

| | | | |
|---|---|---|---|
| 8,618,906 B2* | 12/2013 | Al-Jafar | E01F 13/085 340/435 |
| 9,028,166 B2* | 5/2015 | Morgan | E01F 13/08 404/6 |

* cited by examiner

PARKING BARRIER AND BATTERY CHARGING APPARATUS USING SAME

FIELD

The subject matter herein generally relates to a parking barrier for preventing vehicles from using reserved spaces and a battery charging apparatus using the parking barrier.

BACKGROUND

Battery charging apparatus are used to supply electric power to electric vehicles in a battery charging station. However, a parking space of the battery charging station is usually occupied. Parking barrier for parking lots and passage ways are well known and have been in widespread public use for many years.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. The term "comprising," when utilized, means "including, but not necessarily limited to"; it specifically indicates open-ended inclusion or membership in the so-described combination, group, series and the like.

The present disclosure is described in relation to a battery charging apparatus. The battery charging apparatus can include a charging pile, a driving member electrically coupled to the charging pile and powered by the charging pile, and a parking barrier positioned adjacent to the charging pile. The parking barrier can include a fixing base, a barrier mechanism, an elastic member, a connecting member. The barrier mechanism can be rotatably coupled with the fixing base. The elastic member can be positioned between the fixing base and the barrier mechanism. One end of the connecting member can be coupled with the barrier mechanism, and another end of the connecting member can be coupled with the driving member, wherein the barrier mechanism is driven to fall down when the driving member pulls the connecting member.

The present disclosure is described in relation to a parking barrier for a battery charging apparatus. The parking barrier can include a fixing base, a barrier mechanism, an elastic member, a connecting member. The barrier mechanism can be rotatably coupled with the fixing base. The elastic member can be positioned between the fixing base and the barrier mechanism. One end of the connecting member can be coupled with the barrier mechanism, and another end of the connecting member can be configured for coupling with a driving member powered by a charging pile, wherein the barrier mechanism is driven to fall down when the driving member pulls the connecting member.

Figure 1:
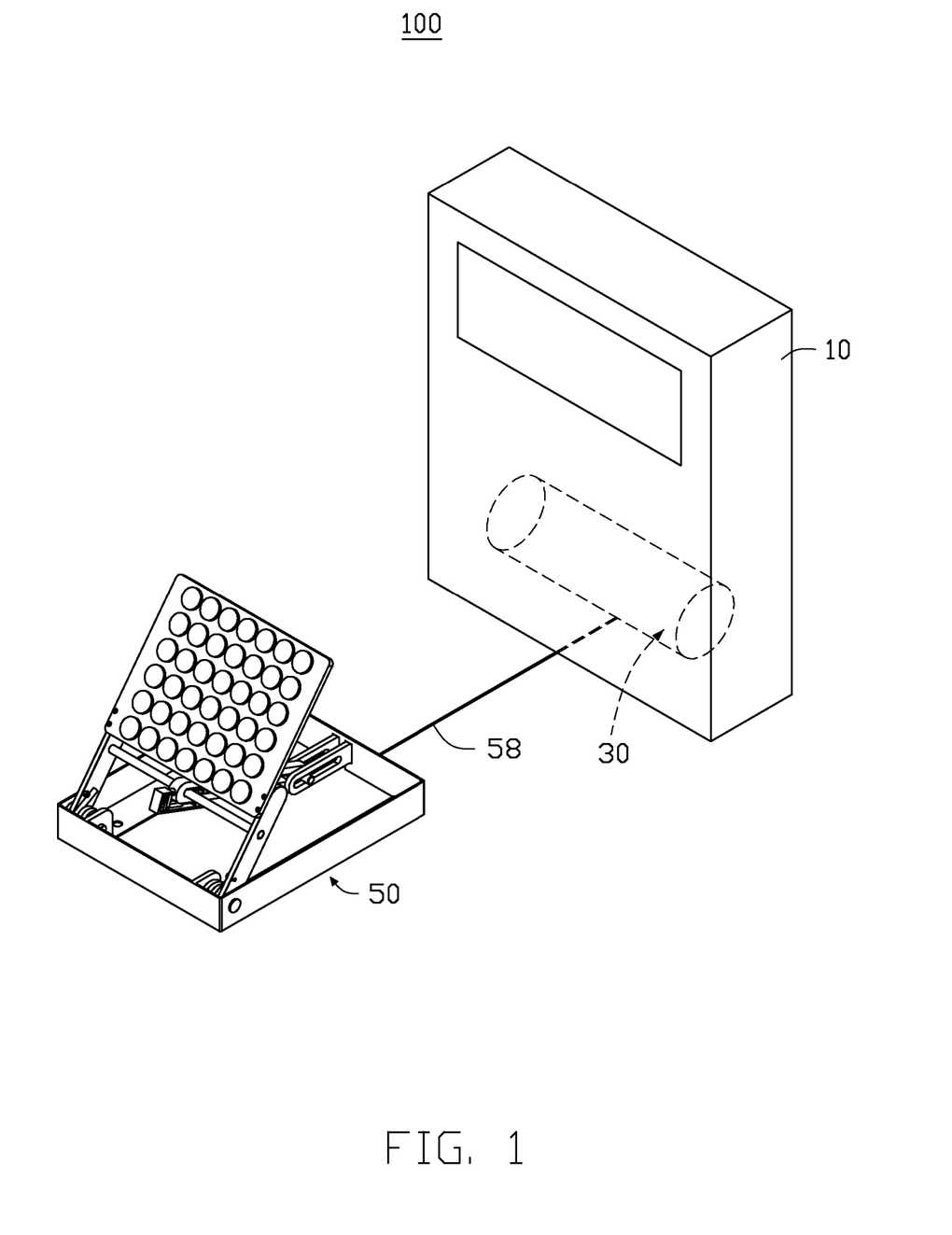
FIG. 1 illustrates an isometric view of a battery charging apparatus including a parking barrier and a charging pile.

FIG. 1 illustrates a battery charging apparatus 100 for supplying electric energy to electric vehicle (not shown). The battery charging apparatus 100 can include a charging pile 10, a driving member 30 electrically coupled to the charging pile 10 and a parking barrier 50 coupled to the driving member 30. The driving member 30 can be powered by the charging pile 10 for controlling a barrier mechanism 53 (as shown in FIG. 2) of the parking barrier 50 to automatically rise up or fall down.

Figure 2:
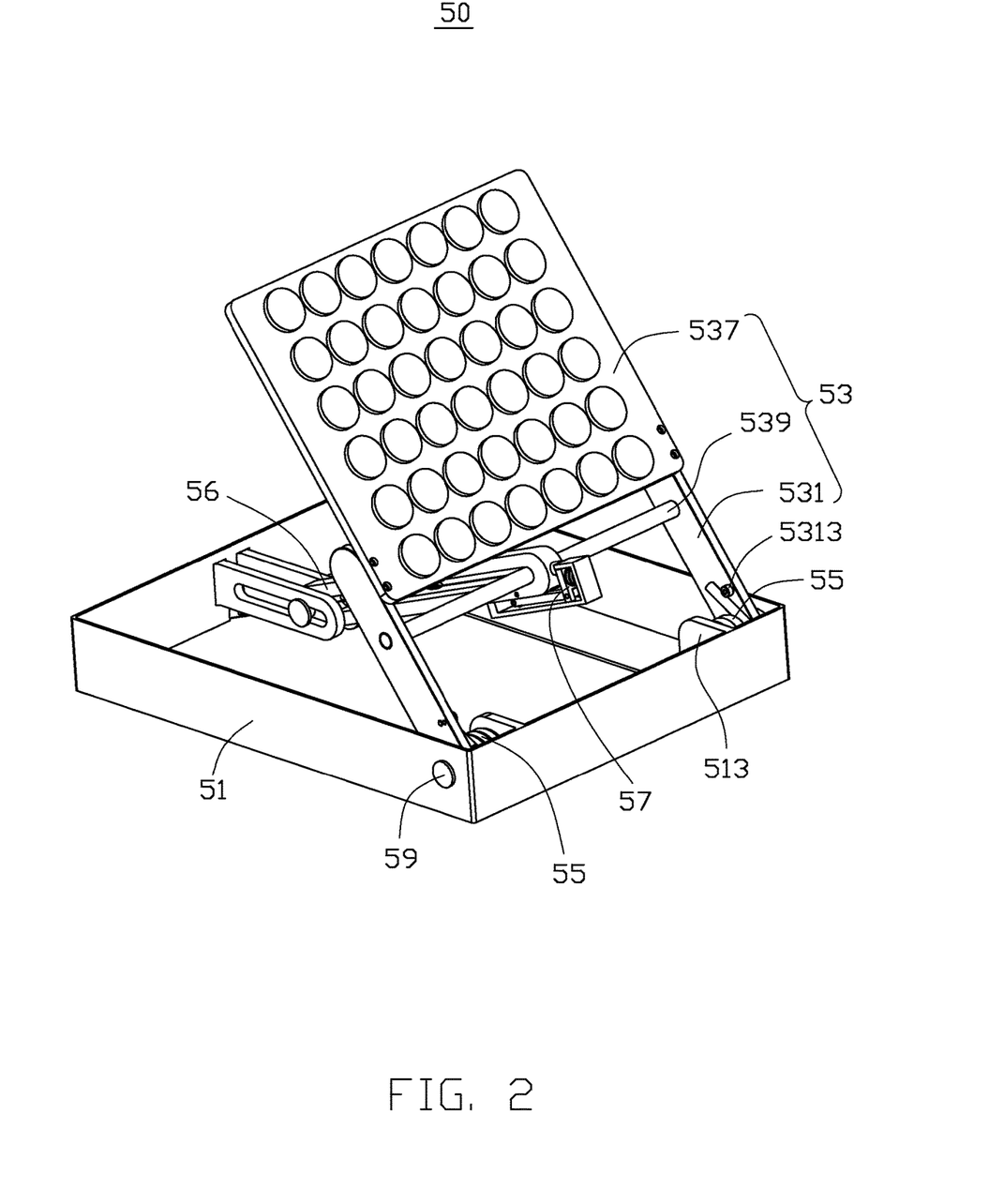
FIG. 2 illustrates an isometric view of a barrier state for the parking barrier of FIG. 1.
Figure 3:
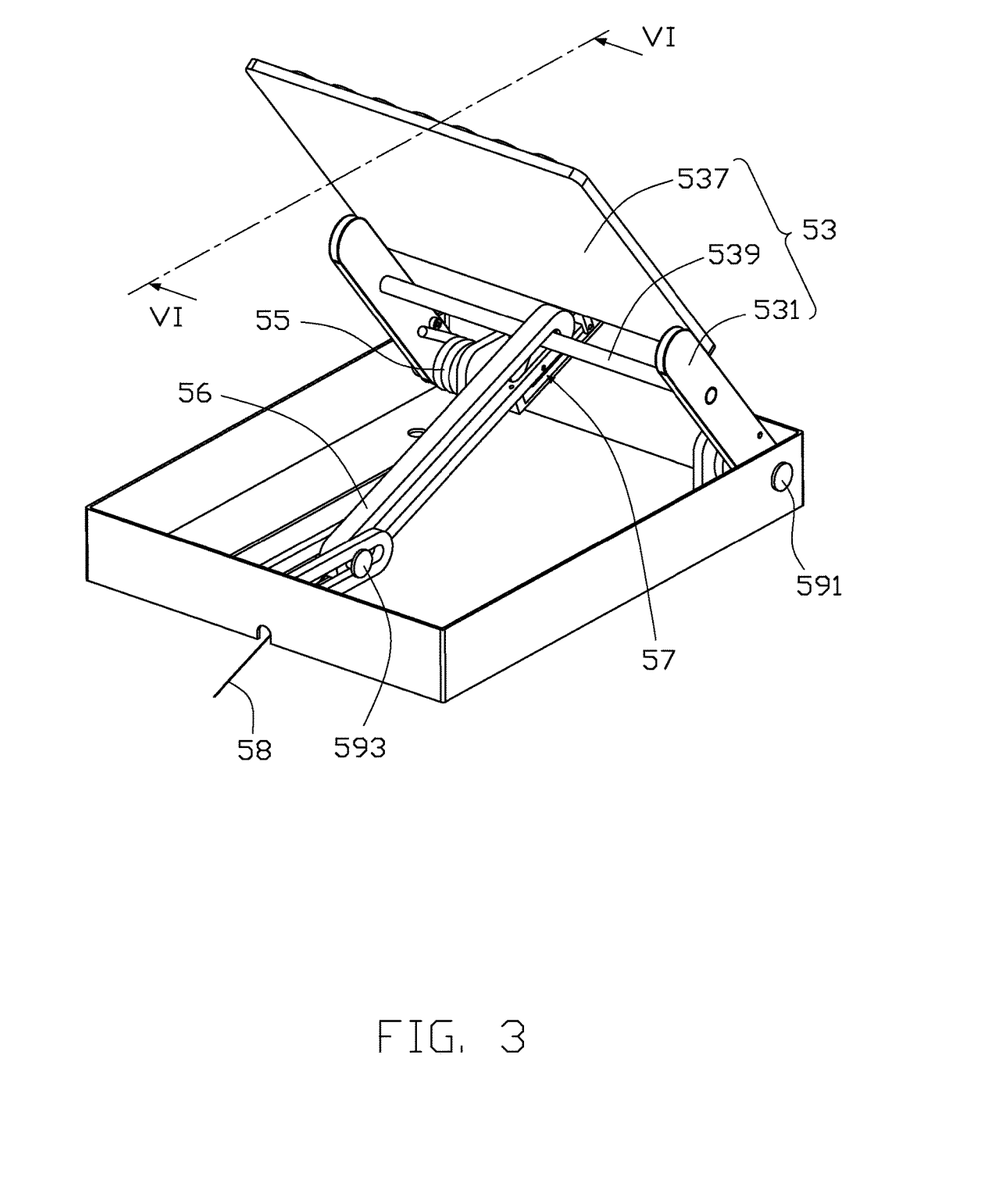
FIG. 3 similar to FIG. 2, but viewed from another angle.
Figure 4:
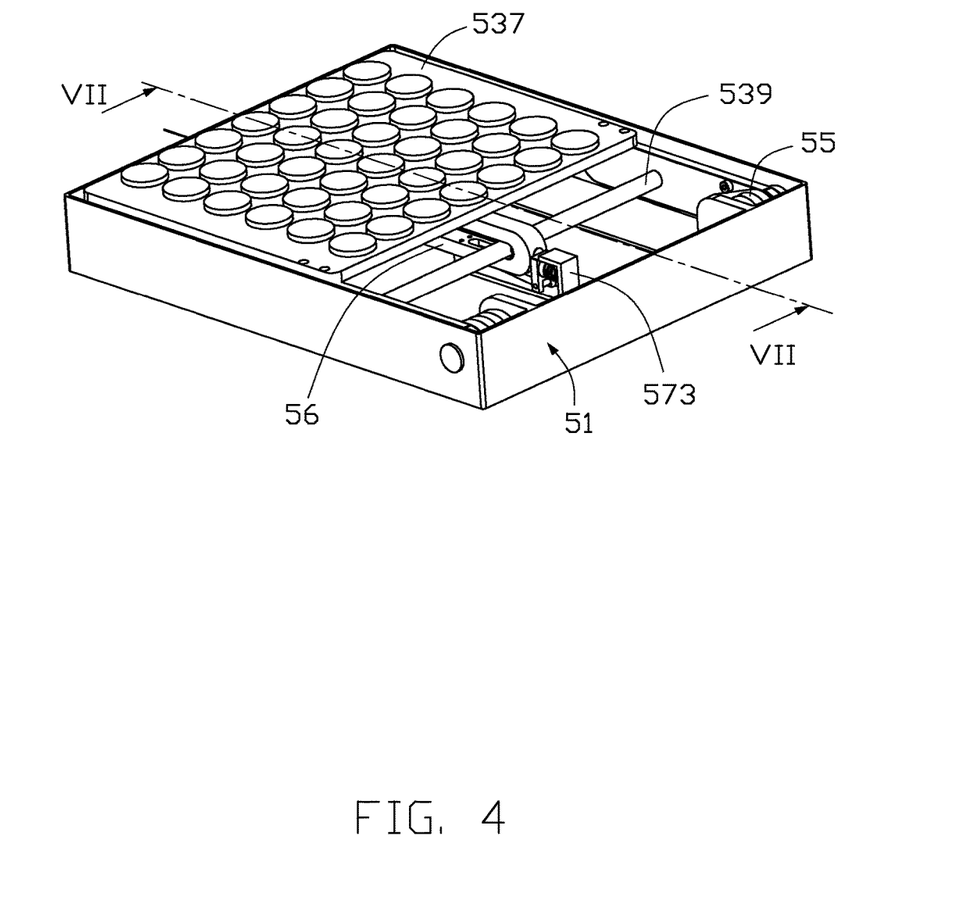
FIG. 4 illustrates an isometric view of a un-barrier state for the parking barrier of FIG. 1.

FIG. 2 illustrates that the parking barrier 50 can include a fixing base 51, the barrier mechanism 53, two elastic members 55, a bracket 56, a locking means 57, a connecting member 58 (as shown in FIG. 3), and three pivoting shafts 59. The barrier mechanism 53 can be rotatably coupled with the fixing base 51. The elastic members 55 can be positioned between the fixing base 51 and the barrier mechanism 53. The bracket 56 can be movably coupled with the barrier mechanism 53 and the fixing base 51. The locking means 57 can be positioned on the bracket 56. The connecting member 58 can be coupled to the barrier mechanism 53 and pass through the bracket 56. The three pivoting shafts 59 can include two first pivot shafts 591 (as shown in FIG. 3) and a second pivot shaft 593 (as shown in FIG. 3). FIG. 4 illustrates a un-barrier state for the parking barrier 50, which the barrier mechanism 53 falls down and received in the fixing base 51.

Figure 5:
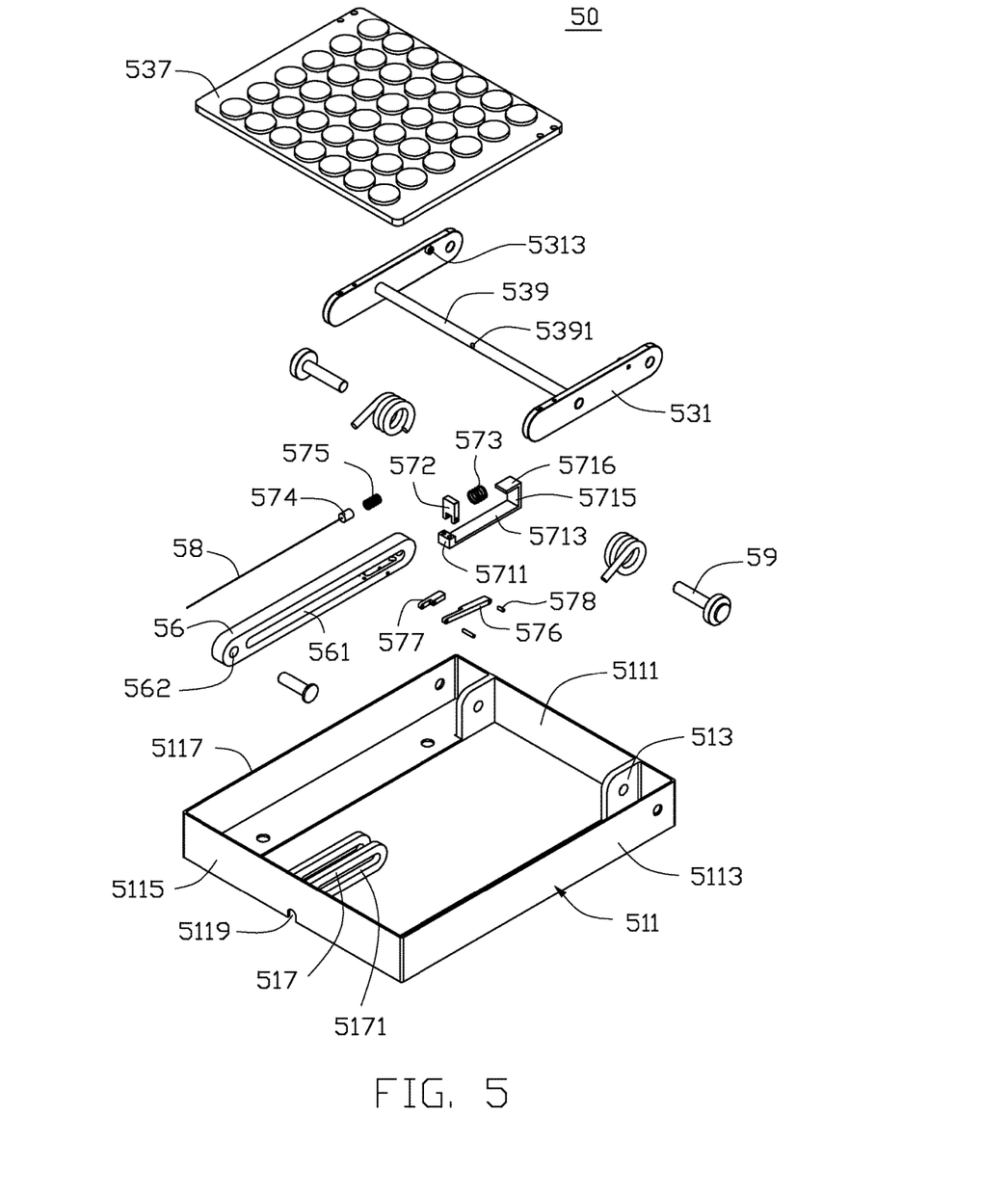
FIG. 5 illustrates an exploded, isometric view of the parking barrier of FIG. 4.

Referring to FIG. 5, the fixing base 51 can include a base body 511, two protrusion ears 513, and two support portions 517. The base body 511 can be substantially in a rectangular shape and configured for fixing with a ground of a parking space corresponding to the charging pile 10. The base body 511 can include a first sidewall 5111, a second sidewall 5113, a third sidewall 5115 and a fourth sidewall 5117. The first sidewall 5111, the second sidewall 5113, the third sidewall 5115 and the fourth sidewall 5117 can couple in sequence and cooperatively form a frame. The first sidewall 5111 and the third sidewall 5115 can be positioned oppositely and substantially in parallel. The second sidewall 5113 and the fourth sidewall 5117 can be positioned oppositely and substantially in parallel. The two protrusion ears 513 can be individually positioned on the first sidewall 5111 towards the third sidewall 5115. One protrusion ear 513 can be positioned adjacent to the second sidewall 5113, and the other protrusion ear 513 can be positioned adjacent to the fourth sidewall 5117. The two support portions 517 can be positioned on the third sidewall 5115 and positioned towards the first sidewall 5111. A guiding hole 5171 can be formed on each of the support portions 517. A penetrating hole 5119 can be formed on and through the third sidewall 5115 and positioned between the two support portions 517.

The barrier mechanism 53 can include two support arms 531, a barrier board 537, and a guiding rod 539. One support arm 531 can be rotatably coupled to the second sidewall 5113 via one of the two first pivot shafts 591 and one of the two protrusion ears 513 positioned adjacent to the second sidewall 5113. The other support arm 531 can be rotatably coupled to the fourth sidewall 5117 via the other one of the two first pivot shafts 591 and the other of the two protrusion ears 513 positioned adjacent to the fourth sidewall 5117. The two support arms 531 can be substantially in parallel. A mounting portion 5313 can be positioned on a sidewall of each support arm 531 towards the protrusion ears 513. The barrier board 537 can be fixedly coupled on the two support arms 53 and positioned away from the first sidewall 5111. The guiding pod 539 can be coupled between the two support arms 531. A penetrating hole 5391 can be defined in a substantially middle portion of the guiding pod 539.

Each elastic member 55 can be sleeved on one first pivot shaft 591, and coupled between one corresponding mounting portion 5313 and one corresponding protrusion ear 513, to bias the support arm 531 to keep in a barrier state, that is a standing position, for preventing vehicles using the parking space, and help the support arm 531 to return the barrier state from the un-barrier state, via stored elastic energy of each elastic member 55.

Figure 7:
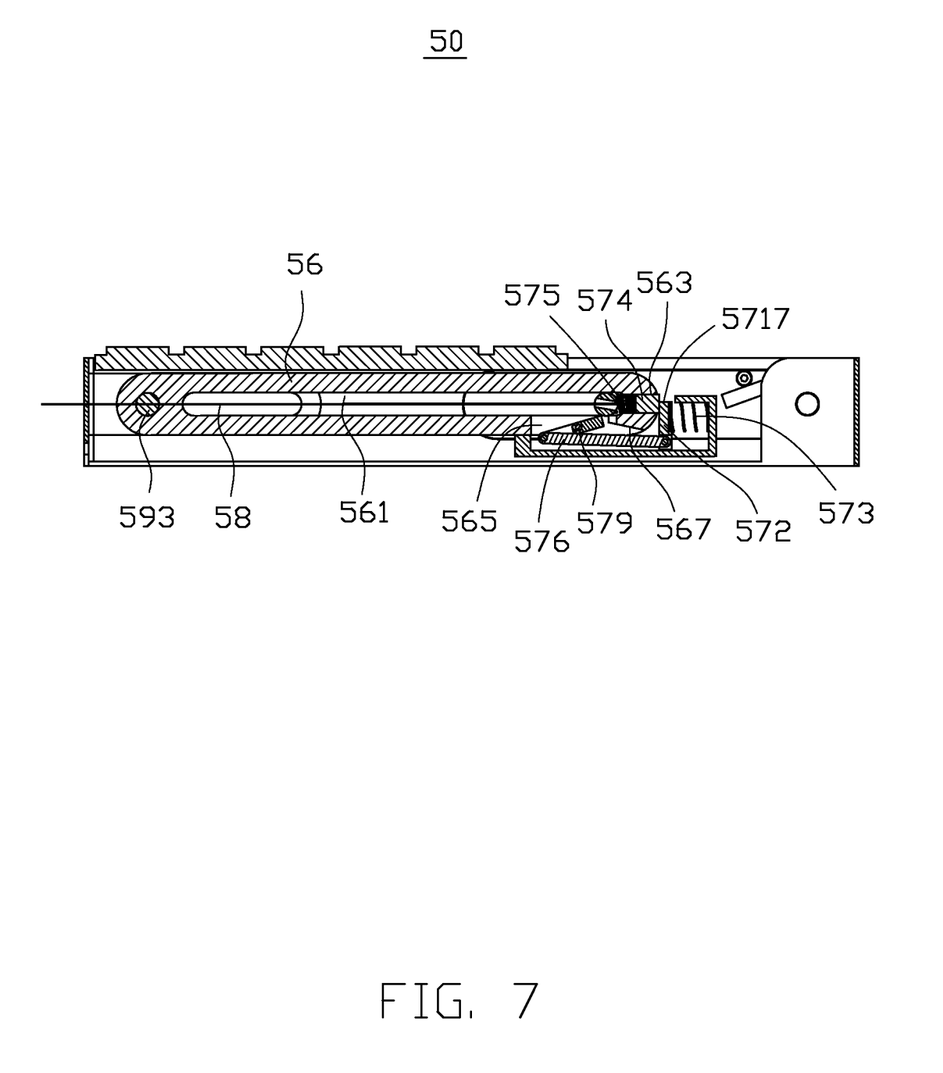
FIG. 7 illustrates a cross-section view of the parking barrier of FIG. 4 along a line VII-VII.

The bracket 56 can be movable relative to the support portion 517 and the guiding rod 539, respectively. In the illustrated embodiment, the bracket 56 can define a ribbon-shaped sliding portion 561. A connecting hole 562 can be defined in an end of the bracket 56. The second pivot shaft 593 (as shown in FIG. 3) can pass through the connecting hole 562 and movably coupled to each guiding hole 5171 of the two support portions 517. The guiding rod 539 can pass through the sliding portion 561. A first through hole 563 (as shown in FIG. 7) and a second through hole 565 (as shown in FIG. 7) can be formed in a sidewall of the sliding portion 561. The first through hole 563 can be positioned in an end of the bracket 56 away from the connecting hole 562 and the support portion 517. The second through hole 565 can be located in a lower portion of the sidewall of the bracket 56 towards a bottom of fixing base 51, and positioned adjacent to the first through hole 563. A incline surface 567 can be formed on the sidewall of the bracket 56 and positioned adjacent to the first through hole 563 and the second through hole 565. A stop portion 569 can be recessed from the sidewall of the sliding portion 561.

Figure 6:
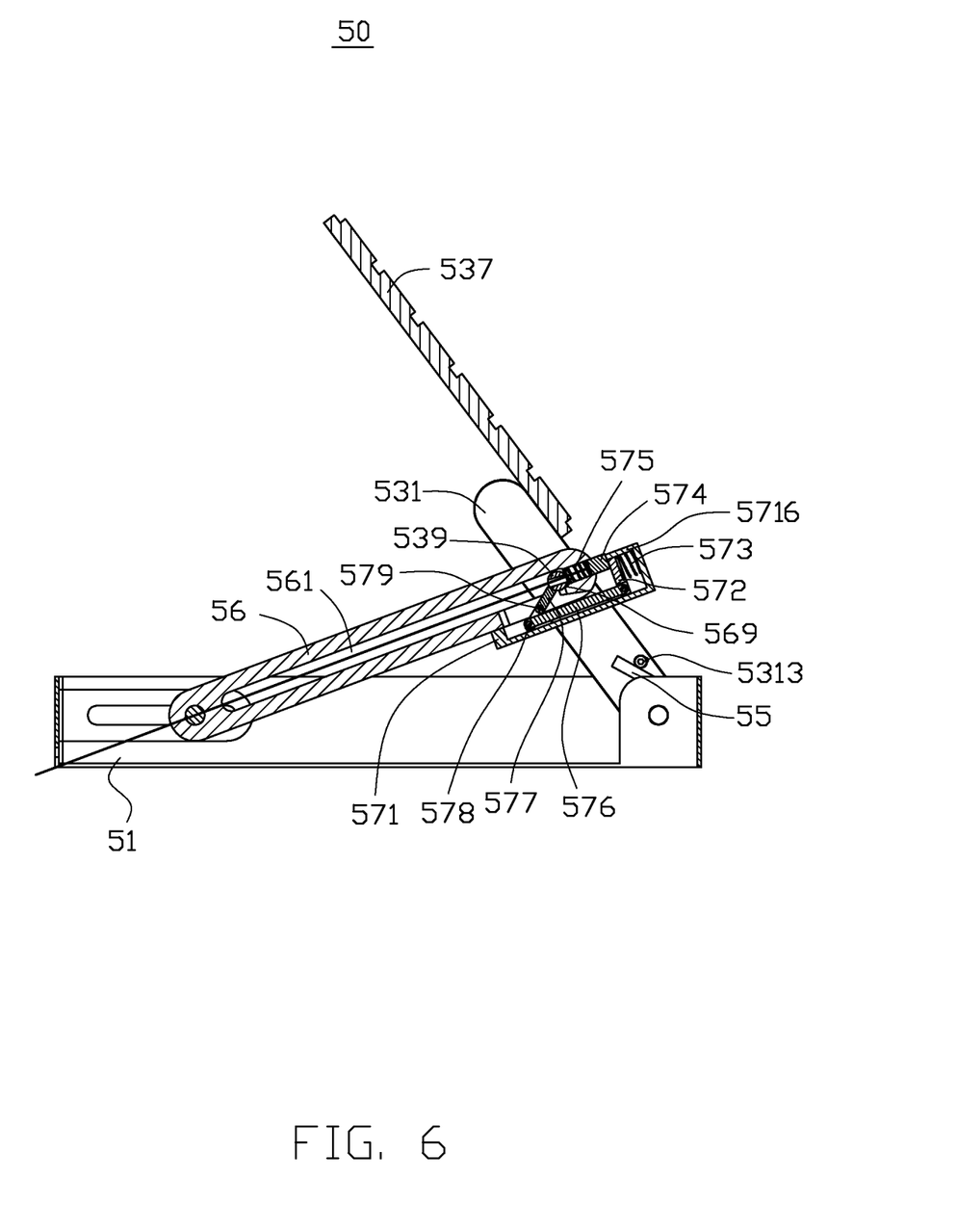
FIG. 6 illustrates a cross-section view of the parking barrier of FIG. 3 along a line VI-VI.

Referring to FIGS. 5, 6 and 7, the locking means 57 can be positioned on the bracket 56 for preventing the guiding rod 539 from moving with respect to the bracket 56. The locking means 57 can include a cover 571, a sliding block 572, a resilient member 573, a sliding member 574, an elastic element 575, a first linkage rod 576, a second linkage rod 577, two rotating shafts 578, and a support shaft 579.

The cover 571 can be fixed on one end of the bracket 56 away from the fixing base 51, and positioned adjacent to the first through hole 563 and the second through hole 565. In the illustrated embodiment, the cover 571 can be substantial in a frame shape. The cover 571 can include a first connecting portion 5711, a second connecting portion 5713, a third connecting portion 5715 and a fourth connecting portion 5716. The first connecting portion 5711 can be coupled to a sidewall of the bracket 56 towards the bottom of the fixing base 51. The first connecting portion 5711 can be positioned adjacent to the second through hole 565 and away from the first through hole 563. The second connecting portion 5713 can be at a bending extension from an end of the first connecting portion 5711 and be positioned oppositely to the bracket 56. The third connecting portion 5713 can substantially perpendicularly extend from an end of the second connecting portion 5715 away from the first connecting portion 5711. The third connecting portion 5715 can be spaced from the bracket 56. The fourth connecting portion 5716 can substantially perpendicularly extend from an end of the third connecting portion 5715 away from the second connecting portion 5715. The second connecting portion 5713 can be positioned oppositely to the fourth connecting portion 5716. A gap 5717 (as shown in FIG. 7) can be formed between the bracket 56 and the fourth connecting portion 5716.

The sliding block 572 can be slidably positioned on the second connecting portion 5713. The resilient member 573 can be received in the cover 571. The resilient member 573 can be positioned between the sliding block 572 and the third connecting portion 5715. In the illustrated embodiment, a height of the sliding block 572 can be less than a height of the third connecting portion 5715, the sliding block 572 can be received in a receiving space cooperatively formed by the second connecting portion 5713, the third connecting portion 5715 and the fourth connecting portion 5716. The sliding member 574 can be slidably positioned in the sliding portion 561. The elastic element 575 can be positioned in the sliding portion 561 between the sliding member 574 and the guiding rod 539. The first linkage rod 576 can be rotatably coupled to the sliding block 572 at one end via one of the two rotating shaft 578. The second linkage rod 577 can be rotatably coupled to a sidewall of the second through hole 565 via a support rod 579. The second linkage rod 577 can be rotatably coupled to the first linkage rod 576 via the other rotating shaft 578. The sliding member 574 can push the sliding block 572 to move. A motion of the sliding block 572 can cause the first linkage rod 576 to move and cause the second linkage rod 577 to rotate about the support rod 579, such that one end of the second linkage rod 577 can stretch out from the second through hole 565 into the sliding portion 561 to resist stop a motion of the guiding rod 539 with respect to the bracket 56.

One end of the connecting member 58 can be coupled to the sliding member 574, and further pass through the resilient member 575, the penetrating hole 5391 of the guiding rod 539, the bracket 56, and the penetrating hole 5119 of the fixing base 51. The other end of the connecting member 58 can coupled to the driving member 30. In the illustrated embodiment, the connecting member 58 can be a wire rope. In at least one embodiment, the connecting member 58 can be other wire or element, which is made of material having wonderful tensile strength.

In assembly, one first pivot shaft 591 can pass through the second sidewall 5113, and further pass through one support arm 531, one elastic member 55, and one protrusion ear 513 adjacent to the second sidewall 5113 in sequence, the other first pivot shaft 591 can pass through the fourth sidewall 5117, and further pass through the other support arm 531, the other elastic member 55, and the other protrusion ear 513 adjacent to the second sidewall 5113 in sequence. Each elastic member 55 can engage with the corresponding mounting portion 5313 and the corresponding protrusion ear 513. The bracket 56 can be movably coupled to the two support portions 517 at one end, via the second pivot shaft 593 passing through the connecting hole 562 and the two guiding hole 5171. The barrier board 537 can be assembled with the two support arms 531. The guiding rod 539 can pass through the sliding portion 561 of the bracket 56 and be coupled to the two support arms 531. The locking means 57 can be mounted on the bracket 56. The connecting member 58 can coupled to the sliding member 574 and pass through the elastic element 575, the penetrating hole 5391 of the guiding god 539, the bracket 56, the second pivot shaft 593, and the penetrating hole 5119 of the fixing base 51. The fixing base 51 can be fixed on the parking space corresponding to the charging pile 10. The other end of the sliding member 574 can be coupled to the driving member 30.

Referring to FIG. 6, the barrier state for the parking barrier 50 is shown, the barrier mechanism 53 and the bracket 56 can extend from the fixing base 51 and keep the standing position for preventing vehicles from using the parking space. The guiding rod 539 can engage with the stop portion 569, the second linkage rod 577 can resist the guiding rod 539 for preventing the guiding rod 539 from rotating with respect to the bracket 56. The sliding member 574 can extend into the gap 5717 (as shown in FIG. 6) and contact with the fourth connecting portion 5716 and the sliding block 572, because of an effort of the elastic element 575.

Referring to FIGS. 1 and 6, the charging pile 10 can supply power to the driving member 30, and the sliding member 574 can be driven to slide along the sliding portion 561 towards the support portion 517. Referring to FIG. 7, the sliding block 572 can be pushed to move until contacting the bracket 56 by an effort of the resilient member 573. The first linkage rod 576 can be caused to rotate the second linkage rod 577 around the support shaft 579 by the sliding block 572, such that the whole second linkage rod 577 can be received in the second through hole 565 for unlocking the barrier mechanism 50. The sliding member 574 can be brought to slide along the sliding portion 561, and then the bracket 56 and the barrier mechanism 53 lay down in the fixing base 51 for allowing the vehicle parking in the parking space.

The driving member 30 can release the connecting member 58 after the vehicle leaves. The barrier mechanism 53 can return the barrier state because of the effort of the elastic member 55. The guiding rod 539 can push the elastic element 575 and the sliding block 574 to return their original positions. The sliding block 572, can be brought to move along the second connecting portion 5713 towards the third connecting portion 5715 by the sliding member 574. The second linkage rod 577 can be rotated around the support shaft 579, and one end of the second linkage rod 577 can be exposed in the sliding portion 561 to resist with the guiding rod 539.

Figure 8:
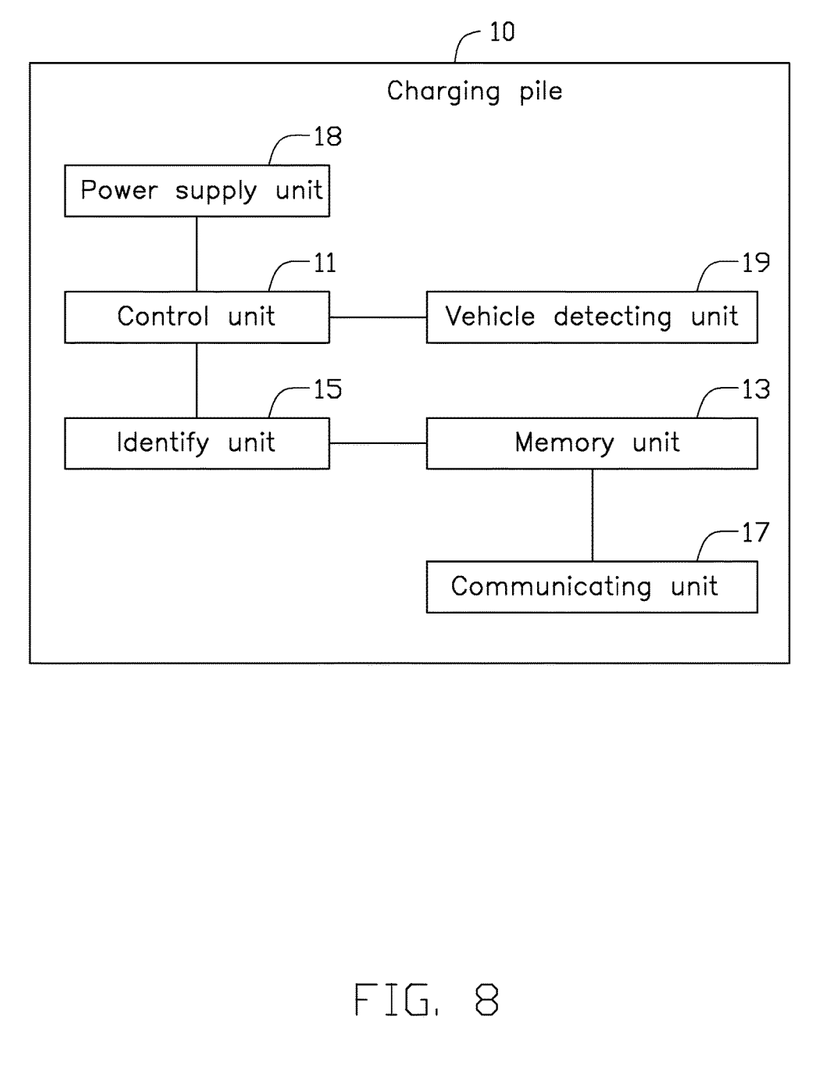
FIG. 8 illustrates a block diagram of an embodiment of the charging pile.

Furthermore, referring to FIG. 8, the charging pipe 10 can include a control unit 11, a memory unit 13, an identify unit 15, and a power supply unit 18. The identify unit 15 can be electrically coupled to the control unit 11 and the memory unit 13. The power supply unit 18 can be electrically coupled to the control unit 11 for supplying power. The memory unit 13 can store information for authorized vehicles. The identify unit 15 can identify the authorized vehicle. In the illustrated embodiment, the identify unit 15 can identify the authorized vehicle according to authorized vehicles information stored in the memory unit 13. The control unit 11 can control the power supply unit 17 to power the driving member 30, and the driving member 30 can be controlled to push the connecting member 58 to fall down the barrier mechanism 53 by the control unit 11, when the vehicle is an authorized vehicle. The barrier mechanism 53 and the bracket 56 can be not allowed to fall down when the vehicle is an unauthorized vehicle.

The charging pile 10 can further include a commutating unit 17 for communicating with other devices (not shown) via network. The charging pile 10 can obtain identify information of the vehicle via wireless technology, for example BLUETOOTH™, in an allowed range from the mobile terminal (not shown). The identify unit 15 can be designed to be a functional module for obtain information stored in a smart card or the mobile terminal. In at least one embodiment, the charging pile 10 can further accept a reservation request via the commutating unit 17 and store the reservation request in the memory unit 13. The reservation request can include information of a reservation vehicle. The charging pile 10 can further include a vehicle detecting unit 19 for detecting the left vehicle. The control unit 11 can control the driving member 30 to release the connecting member 58, then the bracket 56 and the barrier mechanism 53 can automatically lift up, and the locking means 57can lock the parking barrier 50.

In the illustrated embodiment, the elastic member 55, the resilient member 573, and the elastic element 575 can be springs. In at least one embodiment, the elastic member 55, the resilient member 573, and the elastic element 575 can be elastic slice and other elements, which can enable the corresponding element to return its original position.

In other embodiments, the driving member 30 can be not limited to be positioned in an inner portion of the charging pile 10, and it can be positioned outside of the charging pile 10 and powered by the charging pile 10.

In other embodiments, the sliding portion 561 can be not limited to be a through hole, it can be designed to be a groove or a guiding rail, the guiding rod 539 can be movably mate with the sliding portion 561 and move along the sliding portion 561.

In other embodiments, the bracket 56 and the locking means 57 can be omitted, the connecting member 58 can be directly coupled to the barrier mechanism 57.

In other embodiments, the barrier mechanism 57 can omit the barrier board 537 and the guiding rod 539, the connecting member 58 can be directly coupled to the support arm 531.

In other embodiments, the stop portion 569 can be omitted, and the guiding rod 539 can be stopped by an end wall of the sliding portion 561. The incline surface 567 can be omitted when enough space between the cover 571 and the bracket 56 is reserved for the motion of the first linkage rod 576.

In other embodiments, a shape of the cover 571 can be designed to be in other shapes, and the fourth connecting portion 5716 can be omitted.

In other embodiments, the cover 571, the sliding block 572, the resilient member 573, the first linkage rod 576, the second linkage rod 577, the rotating shafts 578, the support shaft 579 and the connecting member 58 can be directly coupled to the sliding member 574.

In other embodiments, the number of the support arm 5311 can be at least one, and the number of the elastic member 55 can be at least one.

In other embodiments, the pivot shafts 59 can be omitted, a protrusion can be formed on the support arm 531 and rotatablly coupled to the fixing base 51, a protrusion can be formed on the bracket 56 to couple with the fixing base 51.

In other embodiments, the rotating shaft 578 and the support shaft 578 can be omitted, the first linkage rod 576 can form protrusions at two ends to rotatably couple with the second linkage rod 577 and the sliding block 572, the second linkage rod 577 can form a protrusion to couple with the sidewalls of the second through hole 565.

The embodiments shown and described above are only examples. Many details are often found in the art such as the other features of a parking barrier and a battery charging apparatus using the parking barrier. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A battery charging apparatus comprising:
    a charging pile;
    a driving member electrically coupled to the charging pile and powered by the charging pile;
    a parking barrier positioned adjacent to the charging pile, comprising:
        a fixing base;
        a barrier mechanism rotatably coupled with the fixing base;
        an elastic member positioned between the fixing base and the barrier mechanism, and the elastic member configured to enable the barrier mechanism to keep in a barrier state for preventing vehicles using a parking space corresponding to the charging pile; and
        a connecting member coupling to the barrier mechanism with the driving member,
    wherein the barrier mechanism is driven to fall down when the driving member pulls the connecting member.

2. The battery charging apparatus of claim 1, wherein the barrier mechanism comprises a support arm and a guiding rod, the support arm is rotatably coupled to the fixing base, the elastic member is positioned between the fixing base and the support arm, the guiding rod is coupled to the support arm, the connecting member is coupled to the guiding rod and is capable of bringing the guiding rod to move relative to the fixing base.

3. The battery charging apparatus of claim 2, wherein the barrier mechanism further comprises a bracket, the bracket is movably coupled to the fixing base, the bracket forms a sliding portion, the guiding god movably mates with the sliding portion.

4. The battery charging apparatus of claim 3, wherein the barrier mechanism further comprises a locking means, the locking means comprises a sliding member and an elastic element, the sliding member is positioned in the sliding portion away from the fixing base, the elastic element is positioned in the sliding portion, the elastic element is positioned between the sliding member and the guiding member, and the connecting member is coupled to the sliding member and passes through the elastic element.

5. The battery charging apparatus of claim 4, wherein a sidewall of the sliding portion defines a first through hole and a second through hole, the first through hole is positioned at an end of the bracket away from the fixing base, the second through hole is positioned on the sidewall of the bracket towards a bottom of the fixing base and the second through hole is positioned adjacent to the first through hole.

6. The battery charging apparatus of claim 5, wherein the locking means further comprises a cover, a sliding block, a resilient member, a first linkage rod, and a second linkage rod, the cover is fixed on the bracket and positioned adjacent to the second through hole, the sliding block is slidably positioned in the cover and is opposite to the bracket, the resilient member is positioned between the sliding block and the sidewall of the cover, the sliding member is capable of being exposed out from the second through hole to push the sliding block, the first linkage rod is rotatably coupled to the sliding block at a first one end, the first linkage rod is rotatably coupled to an end of the second linkage rod at a second one end, the second linkage rod is rotatably coupled to sidewalls of the second through hole, and the second linkage rod is capable of stretch out from the second through hole into the sliding portion to resist the guiding rod.

7. The battery charging apparatus of claim 6, wherein the cover comprises a first connecting portion, a second connecting portion and a third connecting portion, the first connecting portion is coupled to the sidewall of the bracket, the first connecting portion is positioned adjacent to the second through hole and away from the first through hole, the second connecting portion is at a bending extension from the first connecting portion and is opposite to the bracket, the third connecting portion extends from an end of the second connecting portion and positioned away from the first connecting portion, the third connecting portion is spaced from the bracket, the sliding block is slidably positioned on the second connecting portion, the resilient member is positioned between the sliding block and the third connecting portion.

8. The battery charging apparatus of claim 7, wherein the cover further comprises a fourth connecting portion extending from an end of the third connecting portion away from the second connecting portion, the second connecting portion is opposite to the fourth connecting portion, a gap is formed between the bracket and the fourth connecting portion, the sliding member is capable of moving into the gap and pushing the sliding block until the sliding block contacts the fourth connecting portion.

9. The battery charging apparatus of claim 5, wherein a stop portion is recessed in an end of the sliding portion adjacent to the first through hole for engaging with the guiding rod.

10. The battery charging apparatus of claim 5, wherein an incline surface forms on an outer side surface of the bracket towards the bottom of the fixing base, the incline surface is positioned adjacent to the first through hole and the second through hole.

11. The battery charging apparatus of claim 1, wherein the charging pile comprises a control unit, an identify unit and a power supply unit, the identify unit is configured for identifying an authorized vehicle, the control unit is configured for controlling the power supply unit to power the driving member, and the driving member is controlled by the control unit 1 to pull the connecting member to fall down the barrier mechanism automatically when the identify unit identifies the authorized vehicle.

12. A parking barrier configured for a battery charging apparatus, comprising:
a fixing base;
a barrier mechanism rotatably coupled with the fixing base;
an elastic member positioned between the fixing base and the barrier mechanism; and
a connecting member, one end of the connecting member coupling with the barrier mechanism, and another end of the connecting member configured for coupling with a driving member powered by a charging pile, wherein the barrier mechanism is driven to fall down when the driving member pulls the connecting member.

13. The parking barrier of claim 12, wherein the barrier mechanism comprises a support arm and a guiding rod, the support arm is rotatably coupled to the fixing base, the elastic member is positioned between the fixing base and the support arm, the guiding rod is coupled to the support arm, the connecting member is coupled to the guiding rod and is capable of bringing the guiding rod to move relative to the fixing base.

14. The parking barrier of claim 13, wherein the barrier mechanism further comprises a bracket, the bracket is movably coupled to the fixing base, the bracket forms a sliding portion, the guiding god movably mates with the sliding portion.

15. The parking barrier of claim 14, wherein the barrier mechanism further comprises a locking means, the locking means comprises a sliding member and an elastic element, the sliding member is positioned in the sliding portion away from the fixing base, the first elastic element is positioned in the sliding portion, the first elastic element is positioned between the sliding member and the guiding member, and the connecting member is coupled to the sliding member and passes through the first elastic element.

16. The parking barrier of claim 15, wherein a sidewall of the sliding portion defines a first through hole and a second through hole, the first through hole is positioned at an end of the bracket away from the fixing base, the second through hole is positioned on the sidewall of the bracket towards a bottom of the fixing base.

17. The parking barrier of claim 16, wherein the locking means further comprises a cover, a sliding block, a resilient member, a first linkage rod, and a second linkage rod, the cover is fixed on the bracket and positioned adjacent to the second through hole, the sliding block is slidably positioned in the cover and is opposite to the bracket, the resilient member is positioned between the sliding block and the sidewall of the cover, the sliding member is capable of being exposed out from the second through hole to push the sliding block, the first linkage rod is rotatably coupled to the sliding block at a first one end, the first linkage rod is rotatably coupled to an end of the second linkage rod at a second one end, the second linkage rod is rotatably coupled to sidewalls of the second through hole, and the second linkage rod is capable of stretch out from the second through hole into the sliding portion to resist the guiding rod.

18. The parking barrier of claim 17, wherein the cover comprises a first connecting portion, a second connecting portion and a third connecting portion, the first connecting portion is coupled to the sidewall of the bracket, the first connecting portion is positioned adjacent to the second through hole and away from the first through hole, the second connecting portion is at a bending extension from the first connecting portion and is opposite to the bracket, the third connecting portion extends from an end of the second connecting portion and positioned away from the first connecting portion, the third connecting portion is spaced from the bracket, the sliding block is slidably positioned on the second connecting portion, the resilient member is positioned between the sliding block and the third connecting portion.

19. The parking barrier of claim 18, wherein the cover further comprises a fourth connecting portion extending from an end of the third connecting portion away from the second connecting portion, the second connecting portion is opposite to the fourth connecting portion, a gap is formed between the bracket and the fourth connecting portion, the sliding member is capable of moving into the gap and pushing the sliding block until the sliding block contacts the fourth connecting portion.

20. The parking barrier of claim 14, wherein a stop portion is recessed in an end of the sliding portion adjacent to the first through hole for engaging with the guiding rod.

* * * * *